(12) United States Patent
Bron

(10) Patent No.: US 7,185,669 B2
(45) Date of Patent: Mar. 6, 2007

(54) PROPORTIONER

(76) Inventor: Dan Bron, 39/47 Soroka Street, Halfa (IL) 34759

( * ) Notice: Subject to any disclaimer, the term of this patent is extended or adjusted under 35 U.S.C. 154(b) by 278 days.

(21) Appl. No.: 10/882,402

(22) Filed: Jul. 2, 2004

(65) Prior Publication Data

US 2005/0034758 A1    Feb. 17, 2005

(30) Foreign Application Priority Data

Jul. 3, 2003  (IL) .................................. 156756
Dec. 28, 2003 (IL) .................................. 159610

(51) Int. Cl.
*G05D 11/03* (2006.01)
(52) U.S. Cl. ........................................ 137/98; 137/114
(58) Field of Classification Search ................ 137/98, 137/114, 893, 895, 100
See application file for complete search history.

(56) References Cited

U.S. PATENT DOCUMENTS

| 926,848 | A | * | 7/1909 | Carlson .................... 261/50.2 |
|---|---|---|---|---|
| 2,883,996 | A | | 4/1959 | Blewett et al. |
| RE25,037 | E | * | 9/1961 | Brazier |
| 3,934,604 | A | * | 1/1976 | Sanderson et al. ............ 137/98 |
| 4,069,835 | A | | 1/1978 | Stadler |
| 4,224,956 | A | * | 9/1980 | Klein ....................... 137/114 |
| 4,354,516 | A | * | 10/1982 | Newell ...................... 137/98 |
| 4,905,724 | A | * | 3/1990 | Ranalletta et al. .......... 137/114 |
| 4,971,118 | A | | 11/1990 | Cluff |
| 5,857,589 | A | | 1/1999 | Cline et al. |

FOREIGN PATENT DOCUMENTS

| EP | 0 509 626 | 10/1992 |
|---|---|---|
| WO | WO-95/13573 | 5/1995 |
| WO | WO-98/45034 | 10/1998 |

* cited by examiner

*Primary Examiner*—Stephen M. Hepperle
(74) *Attorney, Agent, or Firm*—Stites & Harbison PLLC; Marvin Petry

(57) ABSTRACT

There is provided a proportioner for the internal admixture, at a constant proportioning ratio, of an inflowing liquid additive to a liquid carrier, the proportioner including a first flow-attenuating means, and a second flow-attenuating means, wherein the first and second flow-attenuating means are mechanically coupled and biased by biasing means against the carrier inflow.

7 Claims, 5 Drawing Sheets

US 7,185,669 B2

PROPORTIONER

FIELD OF THE INVENTION

The present invention relates to a proportioner.

BACKGROUND OF THE INVENTION

Fluid systems frequently require the supplementation of an additive to a pressurized carrier liquid, with the additive/carrier ratio being constant, predetermined and independent of the instantaneous parameters of pressure and flow in the system.

In systems with pipelines up to a diameter of 1", this is achieved by means of proportional injection pumps of the hydraulic in-line type. In larger systems, use is made of electro-mechanical systems in which the injection rate of on-line hydraulic pumps is computer-controlled.

DISCLOSURE OF THE INVENTION

It is thus an object of the present invention to provide a proportioner for the proportioning of fluid additives supplied at pressures equal to, or higher than line pressure, with the additive/carrier ratio remaining constant throughout the duration of flow, a component that is of the passive type, i.e., does not need external energy sources, and has no moving parts that would require servicing or undergoing amortization, and that is capable of operating under any pressure sources acting on the additive, such as electric or hydraulic pumps, pressure-equalizing vessels and the like.

According to the invention, this is achieved by providing a proportioner for the internal admixture, at a constant proportioning ratio, of an inflowing liquid additive to a liquid carrier, said proportioner comprising a first flow-attenuating means, and a second flow-attenuating means, wherein said first and second flow-attenuating means are mechanically coupled and biased by biasing means against the carrier inflow.

BRIEF DESCRIPTION OF THE DRAWINGS

The invention is herein described, by way of example only, with reference to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 illustrates a cross-sectional view of a first embodiment of the proportioner according to the present invention;

FIG. 2 illustrates a variant of the embodiment of FIG. 1 with integral pressure equalizing valve;

FIG. 3a represents a variable proportioner in accordance with one embodiment of the present invention;

FIG. 3b represents a variable proportioner in accordance with another embodiment of the present invention; and FIG. 4 illustrates variants of a variable proportioner with a pressure equalizing valve.

DETAILED DESCRIPTION

Figure 1:
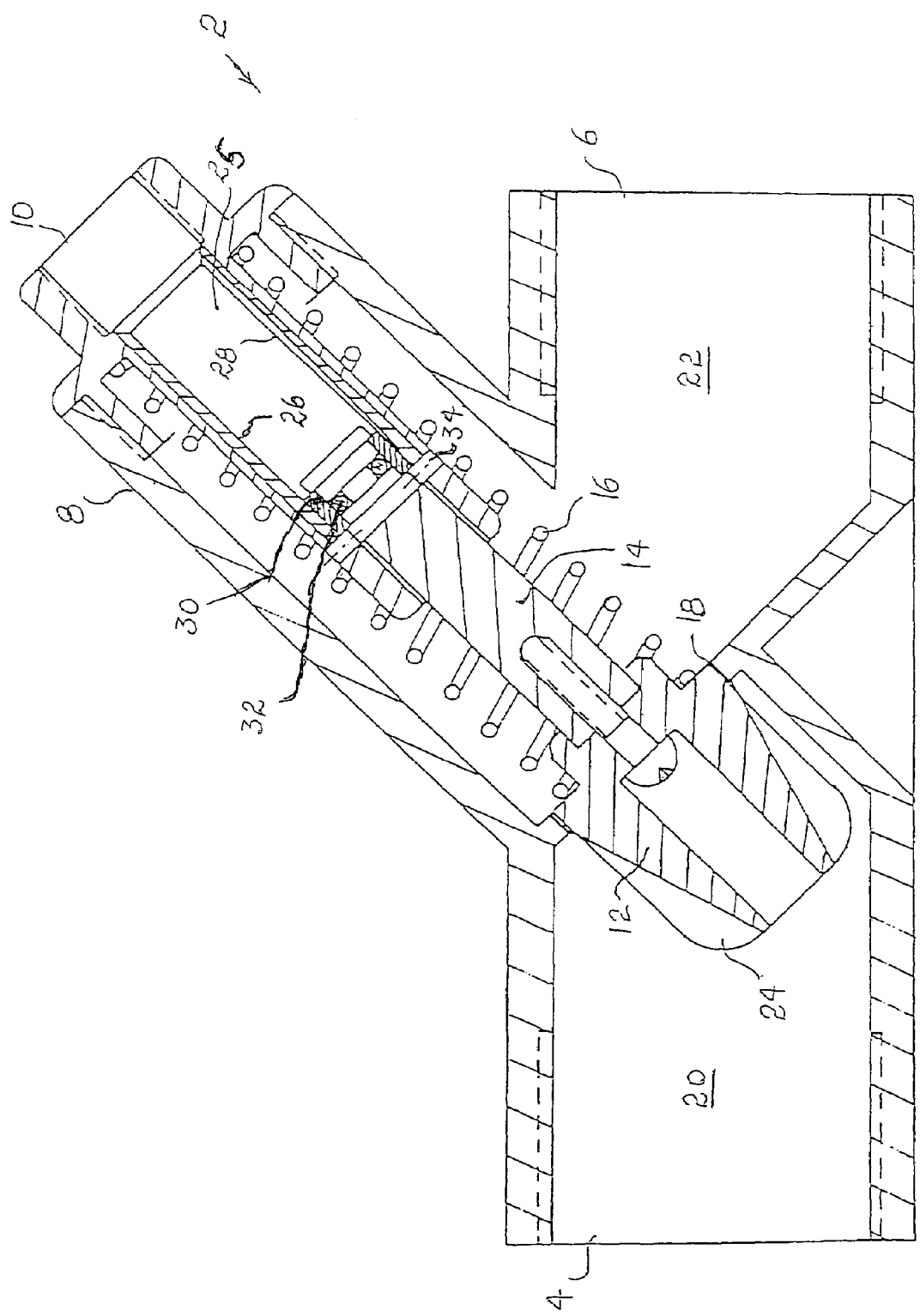

Referring now to the drawings, there is seen in FIG. 1 a schematic representation of the proportioner according to the invention. Shown is the proportioner 2 in its outer shape, of a substantially T-like configuration and having an inlet port 4 and an outlet port 6. Branch 8 of proportioner 2 is usually, although not necessarily, inclined and has an additive inlet 10.

Proportioner 2 according to the invention, requires no external energy for its mixing operation, the energy used up coming from the pressure drop $\Delta P$ between the inlet side $P_{in}$ of proportioner 2 and its outlet side $P_{out}$: hence, $\Delta P = P_{in} - P_{out}$, e.g., an optional pressure drop of about 0.3 atm. This embodiment requires the additive to reach its inlet 10 at a pressure identical to the carrier's input pressure $P_{in}$.

There is seen a tapering valve head 12, which is connected to a valve stem 14. The valve head 12 is biased by a helical spring 16 to close a gate 18 that separates inlet space 20 from outlet space 22. Spring 16 is calculated to start yielding only to a pressure of the predetermined $\Delta P$. Beyond that, spring 16 gives gradually and valve head 12 slowly advances, and, because of its conical shape, gradually increases the size of the annular gap between valve head 12 and gate 18, until the established gate opening is sufficient to drop the $\Delta P$ upon the inflow of the carrier liquid. Valve head 12 withdrawal is therefore an indicator of the instantaneous inflow of the proportioner. Tapering valve head 12 is provided with a number of ribs 24 for better guidance.

Further seen in FIG. 1 is a flow-attenuator 25 of the additive, having a sleeve 26 and a substantially axial groove 28 with a bottom slanting away from valve head 12. For easy sliding of valve stem 14 with satisfactory sealing, a Teflon® ring 30 may be used. For further sealing effect, the Teflon® ring may be supported and biased by an elastic O-ring 32. Peripheral openings 34 permit the additive to discharge into space 22. The Teflon® ring seals, at a state of rest, a part of the non-grooved portion of the stem 14, and thereby, prevents additive leakage into the proportioner after the mains shut off.

Attenuator 25 carrying groove 28 can be replaced by other attenuators with different groove cross-sections, to enable the user to choose from a selection of mixing ratios. Since the carrier liquid and the additive are entered to the proportioner at the same pressure, $P_{in}$, since the liquid and the additive are meeting for mixing at the output carrier pressure $P_{out}$ and since for any carrier liquid inflow there is only one specific axial displacement of stem 14, it requires only to calibrate the resistance of the selected effective part of the additive's attenuator, sealed by the Teflon® ring at this position, to impose on the additive inflow to keep the required proportion with the carrier instantaneous flow.

While FIG. 1 shows the groove made in the sleeve and sealed by the outside surface of the Teflon® ring, the opposite is feasible just as well, i.e., the attenuator 25, in the shape of an axial, slanting groove or thread-like variable-depth helical groove of a triangular or rectangular cross-section, can be placed or made along the outer surface of the stem 14 sealed by the inner surface of the Teflon® ring, with or without O-ring 32 provided in the sleeve 26.

Figure 2:
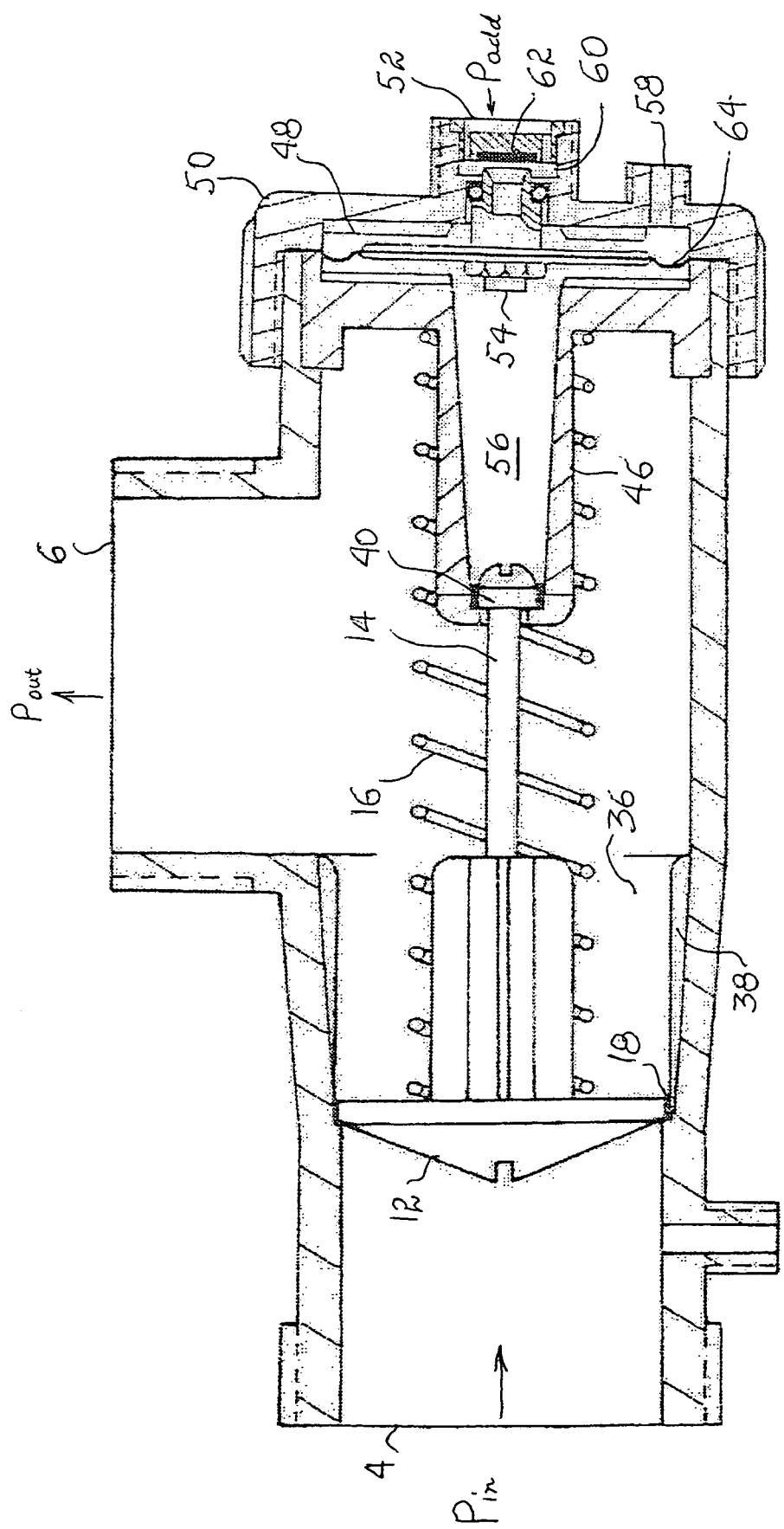

FIG. 2 represents a variant of the embodiment of FIG. 1. Since this embodiment incorporates a pressure equalizer 48 at the additive input, the additive can be entered into the proportioner at any pressure, namely, at a pressure $\geq P_{in}$. Here, the second flow-attenuating feature is now produced by having a tapering skirt 36, surrounding the inside part of inlet 4. The tapered valve head 12 is substantially flat, while the gradually widening annular gap between gate 18 and valve head 12, is formed when the valve head 12 moves inwards. Also provided are a number of guide ribs 38.

The stem 14 carries the head 12 on the inlet side 4 and a smaller head 40 on its other end, the end of the additive attenuator. The stem 14 serves as a mechanical link between the two heads and keeps them coaxial. Both attenuators similarly comprise moving disc-shaped heads inside a coaxially disposed tubular skirt 36 and sleeve 46.

In this embodiment, sleeve 46 is advantageously an integral component of a pressure equalizer 48, the task of which is to equalize the ingoing additive pressure $P_{add}$ to respective pressures of the carrier, $P_{in}$, and of the additive, $P_{add}$. The pressure equalizer 48 may be independent of, i.e., detached from, the proportioner. Pressure equalizer 48 consists of a housing 50, which has three openings: inlet opening 52 to introduce the additive at the as yet under unequalized pressure $P_{add}$, outlet opening 54 through which the now pressure-equalized additive exits the pressure equalizer 48 and enters space 56 in which there exists only additive at the equalized pressure $P_{add}=P_{in}$. The third opening is inlet opening 58 through which reference pressure $P_{in}$ is introduced.

When valve seat 60 and valve pad 62 touch, they prevent passage of additive, with the position of valve seat 60 being controlled by the movement of diaphragm 64, the surfaces of which also include two rigid disks 66. The upper outer side of diaphragm 64 is exposed to $P_{in}$ entering through opening 58, while the lower side is acted upon by the additive that passes through the gap between valve seat 60 and valve pad 62. The moment additive pressure below the inside of diaphragm 64 becomes higher than $P_{in}$, diaphragm 64 is pushed upwards, thereby shutting off further additive supply. Conversely, when additive pressure below the inside of diaphragm 64 falls below $P_{in}$, diaphragm 64 will flex inwards, causing valve seat 60 and valve pad 62 to separate, until pressure is equalized.

The stem movement produced, which is related in proportion to the carrier flow-attenuator's head thread or channel displacement, is largest when the device is at rest and flow rate or input sets the flow of the additive. Clearly, the resistance to flow of the flow-attenuating thread or channel is largest when the device is at rest and decreases the deeper valve head 12 is pushed in against spring 16, and conversely. The total length and cross-section of the respective flow-attenuating paths at each point of their length is so calculated that at any instantaneous position of the compound: valve head 12 and valve stem 14, the additive flow rate will be such that the predetermined proportioning ratio K will be constant, both fluids in their respective flow-attenuating means being driven by $\Delta P=P_{in}-P_{out}$.

The pressure equalizer 48 can also be remotely interposed between the additive pressure source and the proportioner.

Figure 3A:
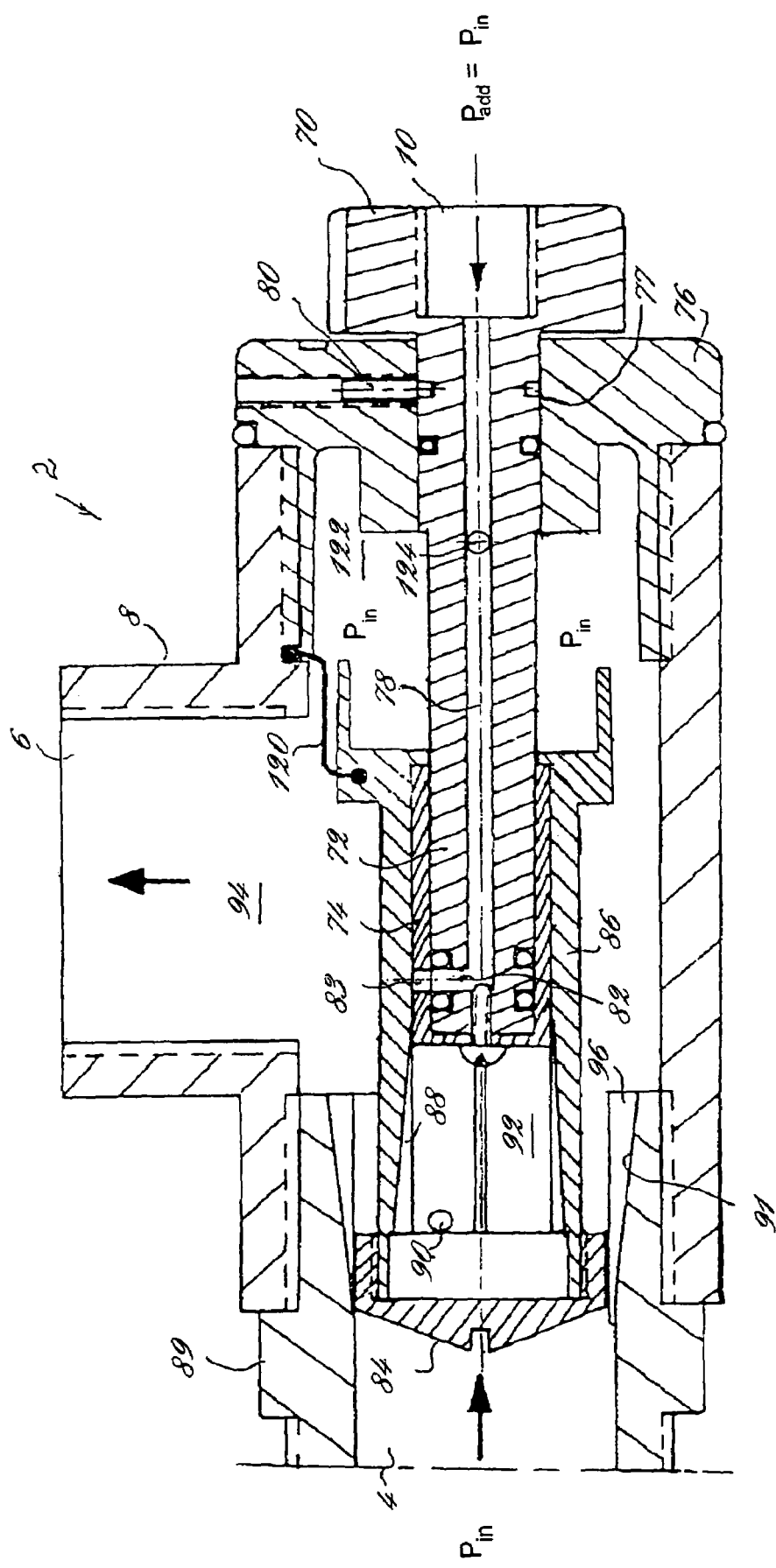
Figure 3B:
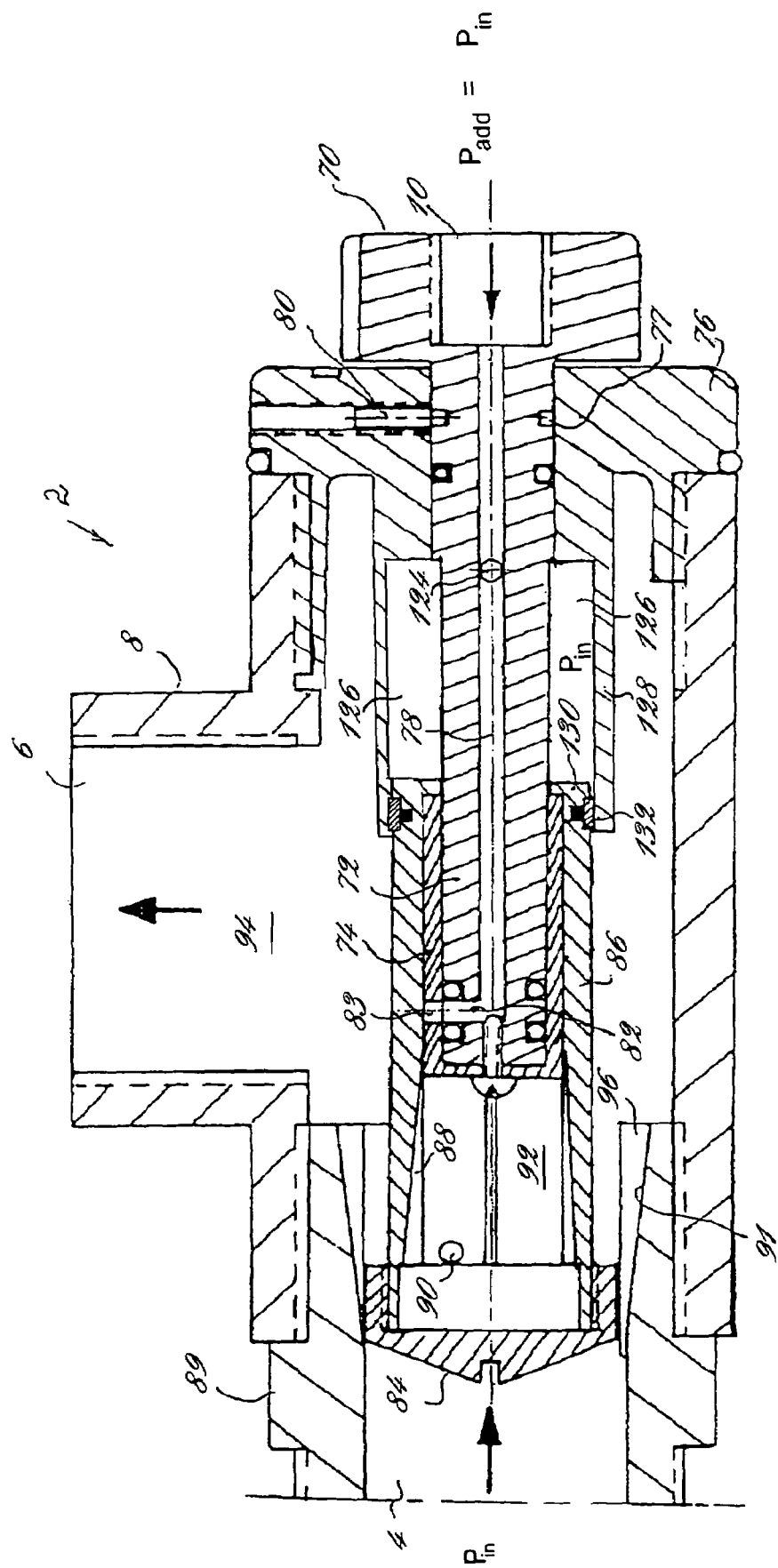

FIGS. 3a and 3b illustrate two alternate proportioners of the variable type in accordance with the present invention. Shown is the proportioner 2 which, in this embodiment, uses a standard T-joint. Seen are three openings: mains inlet port 4, mains plus additive outlet port 6 made in branch 8, and additive inlet 10. Additive arrives at inlet 10 from a pressure equalizer (not shown). Inlet 10 is part of a mixing-ratio setting element comprising a rotatable knob 70, a shaft 72, advantageously integral with knob 70, and a TEFLON® sleeve 74 that is fixedly attached to shaft 72. Knob 70 is provided with an index line cooperating with a scale (not shown).

Shaft 72 is mounted in closure 76 sealing off the additive-side of T-joint 4 and is provided with a first circumferential groove 77, into which reaches the end of a pin 80 thread-mounted in closure 76. Pin 80 provides shaft 72 with one degree of freedom in rotation relative to closure 76, i.e., permit it to rotate, but prevents any axial movement. Further provided in shaft 72 are grooves for O-rings for sealing purposes, as well as a central bore 78 that ends at, and communicates with, a radial hole 82 that passes between two O-rings and registers with a radial hole 83 in TEFLON® sleeve 74.

Also seen is a valve head 84 to which is fixedly attached a hollow valve stem 86 that presents a sliding fit with respect to sleeve 74. Valve stem 86 is also provided with a number of flow-attenuating, slanting, longitudinal grooves 88 each having different dimensions, and a hole 90 via which valve space 92 can communicate with $P_{out}$-space 94. The grooves 88, which corresponds to the desired mixture ratio, is selected by turning knob 70.

In the drawing shown, mains inlet port 4, which is actually constituted by a sleeve 89, the inside end portion of which is provided with a tapering skirt 91, is blocked by valve head 84 which is biased by hydraulic force, demonstrated in two alternative embodiments, one shown in FIG. 3a and one line shown in FIG. 3b. In both of these embodiments, the biasing force constituted previously by spring 16 is replaced by hydraulic force acting axially within a special space made in the embodiment of FIG. 3a by a rolling diaphragm 120 defining an annular space 122 communicating with additive inlet 10 via an opening 124 in central bore 78. As the additive comes from a pressure equalizer (not shown), pressure in space 122 equals $P_{in}$.

In the alternative embodiment shown in FIG. 3b, an annular space 126 defined by a wall section 128 and the edge 130 of valve stem 86. As with space 122, space 126 communicates with inlet 10 via opening 124. In this variant, edge 130 forms an annular piston acted upon by the additive flow. The moving valve stem 86 is sealed off by TEFLON® ring 132.

While the embodiment incorporating a rolling diaphragm 120 of FIG. 3a is more complex, requiring additional components for the mounting of diaphragm 120 (the attachment of which is shown only schematically), it has the advantage of the total absence of friction, adding sensitivity to the proportioner, reacting to the smallest of changes in the mains flow.

As with increasing mains flow the annular gap between valve head 84 and skirt 91 increases, to re-establish the predetermined value of ΔP. Therefore, every mains flowrate causes valve head 84 to assume a unique position, being a measure of the instantaneous mains flowrate. As the mains flowrate increases, the valve stem 86 is slid over sleeve 74 and the effective length of the active cross-section of the selected one of several flow-attenuation grooves 88 becomes shorter. A set of ribs 96 prevents valve head 84 from rotating and maintains concentricity between the moving valve head 84 and skirt 91.

Figure 4:
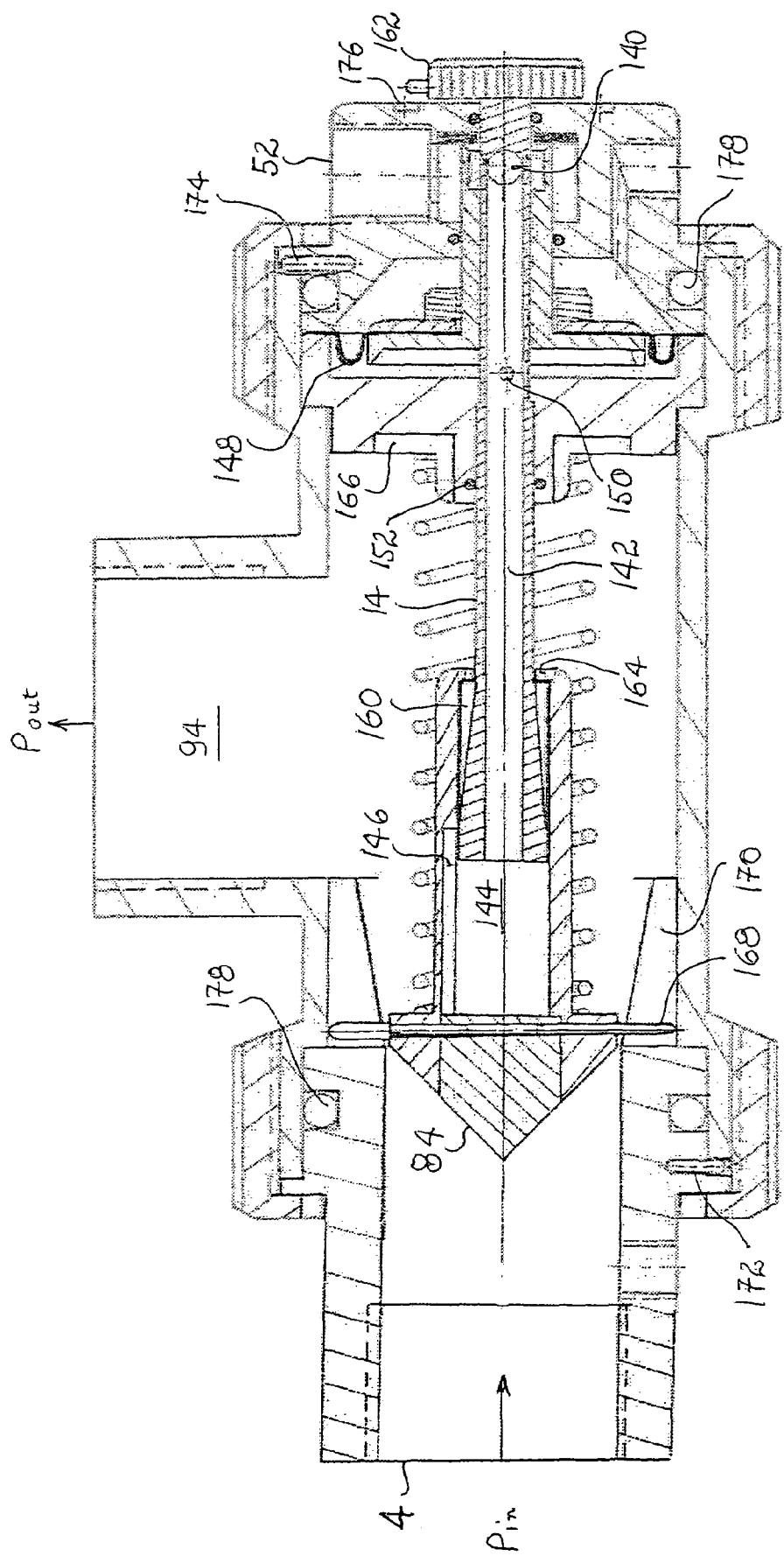

FIG. 4 illustrates a proportioner according to the present invention of a variable type, including an integral pressure equalizer valve through which the additive is being admitted into the proportioner at the line $P_{in}$.

The pressure equalizing valve operates in the same manner as the valve according to the embodiment of FIG. 2, except that the stem 14 passes the pressure equalizing valve in its center and is hollow, in order to pass the additive entering inlet opening 52. The additive is then admitted via the gap in the valve seat, into the opening 140, to the hollow 142 in stem 14 and therefrom, it exits into space 144 and to the feeding channel 146. On its way, the additive reaches the inner side of the diaphragm 148 via opening 150. The pressure equalizer utilizes three 0-ring seals 152 to separate between different pressure zones.

The mains attenuator differs from the one in FIG. 3 by forming the attenuation grooves 160 on the turn able part of stem 14. The additive is directed to the chosen groove by the selecting/feeding channel 146 by means of turning knob 162. The additive flows from the selected groove 160 via opening 164 and the channels 166 to $P_{out}$ space 94. The valve head 84 is coaxially guided and angularly restricted by a set of pins 168 freely sliding in grooves 170. Pins 172 and 174 keep the angular positions during assembly, to ensure proper operation of knob 162 according to scale 176. The two end portions of the device are sealed by O rings 178.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A proportioner for the internal admixture, at a constant proportioning ratio, of an inflowing liquid additive to a liquid carrier, said proportioner comprising:
    a first flow-attenuating means;
    a second flow-attenuating means,
    said first and second flow-attenuating means are mechanically coupled and biased by biasing means against the carrier inflow,
    wherein said first flow-attenuating means is at least one substantially axial groove with a bottom slanting in a direction away from said second flow-attenuating means.

2. The proportioner as claimed in claim 1, wherein said first flow-attenuating means is a disc-shaped head coaxially moveable along tapering skirt-like hollow.

3. The proportioner as claimed in claim 1, wherein said biasing means is a helical compression spring.

4. The proportioner as claimed in claim 1, wherein the effective cross-section of the main path of said second flow-attenuating means is increasing when moved against the biasing force of said biasing means.

5. A porportioner for the internal admixture, at a constant proportioning ratio, of an inflowing liquid additive to a liquid carrier, said proportioner comprising:
    a first flow-attenuating means having a plurality of axial grooves of different liquid conductive cross-sections;
    a second flow-attenuating means,
    said first and second flow-attenuating means are mechanically coupled and biased by biasing means against the carrier inflow, and
    a rotatable control means,
    whereby said liquid additive can be directed optionally into any single one of said plurality of said grooves.

6. The porportioner as claimed in claim 5 wherein said first flow-attenuating means is at least one substantially axial groove with a bottom slanting in a direction away from said second flow-attenuating means.

7. A proportioner for the internal admixture, at a constant proportioning ratio, of an inflowing liquid additive to a liquid carrier, said proportioner comprising:
    a first flow-attenuating means;
    a second flow-attenuating means,
    said first and second flow-attenuating means are mechanically coupled and biased by biasing means against the carrier inflow, and p1 further comprising a pressure equalizer arranged between said first flow-attenuating means and a liquid additive inlet port to equalize the additive pressure to the liquid carrier.

* * * * *